United States Patent
Rofougaran

(10) Patent No.: US 8,014,422 B2
(45) Date of Patent: Sep. 6, 2011

(54) METHOD AND SYSTEM FOR UTILIZING A SINGLE PLL TO CLOCK AN ARRAY OF DDFS FOR MULTI-PROTOCOL APPLICATIONS

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 362 days.

(21) Appl. No.: 11/864,842

(22) Filed: Sep. 28, 2007

(65) Prior Publication Data
US 2009/0086738 A1  Apr. 2, 2009

(51) Int. Cl.
*H04J 1/00* (2006.01)
(52) U.S. Cl. .................... 370/482; 455/255; 455/260
(58) Field of Classification Search ............. 370/482; 455/260, 3.02, 255, 130
See application file for complete search history.

(56) References Cited

U.S. PATENT DOCUMENTS

| | | | |
|---|---|---|---|
| 2002/0008588 A1* | 1/2002 | Khan | 331/18 |
| 2004/0166799 A1* | 8/2004 | Kral | 455/3.02 |
| 2005/0003785 A1* | 1/2005 | Jackson et al. | 455/260 |
| 2005/0266818 A1* | 12/2005 | Johnson et al. | 455/260 |
| 2007/0066261 A1* | 3/2007 | Haralabidis et al. | 455/255 |
| 2007/0213019 A1* | 9/2007 | Devries et al. | 455/130 |
| 2008/0181337 A1* | 7/2008 | Maxim | 375/340 |

* cited by examiner

*Primary Examiner* — Albert T Chou
(74) *Attorney, Agent, or Firm* — McAndrews, Held & Malloy, Ltd.

(57) ABSTRACT

Methods and systems for utilizing a single PLL to clock an array of DDFS for multi-protocol applications are disclosed. Aspects of one method may include generating a first signal for use in generating a plurality of local oscillator (LO) signals. The first signal may be communicated to a plurality of LO generators. Each of the LO signals may be generated independently of each other by a corresponding one of the LO generators. Each of the LO signals may be communicated to one or more mixers, where each mixer may perform downconversion or up-conversion. A LO generator may utilize, for example, a DDFS or a digital delay circuit. A frequency of a LO signal may be varied by adjusting a divide factor for a divider that generates a reference clock for the DDFS or for a divider that generates a second signal used for mixing with a signal generated by the DDFS. The LO signal frequency may also be varied by adjusting frequency control words received by a DDFS.

18 Claims, 11 Drawing Sheets

METHOD AND SYSTEM FOR UTILIZING A SINGLE PLL TO CLOCK AN ARRAY OF DDFS FOR MULTI-PROTOCOL APPLICATIONS

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for utilizing a single phase locked loop (PLL) to clock an array of direct digital frequency synthesizers (DDFS) for multi-protocol applications.

BACKGROUND OF THE INVENTION

Wireless communication has become pervasive throughout our modern society, leading to crowding of allocated communication spectrums. Accordingly, new communication spectrums are being allocated and used for ever increasing applications. As more applications are provided on a mobile terminal, the mobile terminal may need to support various wireless technologies and protocols that may be associated with the applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for utilizing a single PLL to clock an array of DDFS for multi-protocol applications, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing a single PLL to clock an array of DDFS for multi-protocol applications. Aspects of the method may comprise, for example, a variable frequency source, such as a phase locked loop circuit, generating a first signal for use in generating a plurality of local oscillator signals. The first signal may be communicated to a plurality of local oscillator generators. Each of the local oscillator signals may be generated independently of each other by a local oscillator generator. Each of the local oscillator signals may be communicated to one or more mixers, where each mixer may perform a down-conversion of received signals or up-conversion of signals to be transmitted.

Each of the local oscillator signals may be generated by a local oscillator generator that utilizes, for example, a digital delay circuit or a direct digital frequency synthesizer (DDFS). The frequency of a local oscillator signal may be varied by adjusting a divide factor for a divider that generates a reference clock for the DDFS. The frequency of a local oscillator signal may also be varied by adjusting a divide factor for a divider that generates a second signal that is used for mixing with a signal generated by the DDFS. The frequency of a local oscillator signal may also be varied by adjusting one or more frequency control words that are to be received by the DDFS used in that local oscillator generator. The digital delay circuit may generate a second signal that may comprise a substantially 90° phase difference from the first signal. The first signal and the second signal may be mixed together to generate a local oscillator signal.

Figure 1:
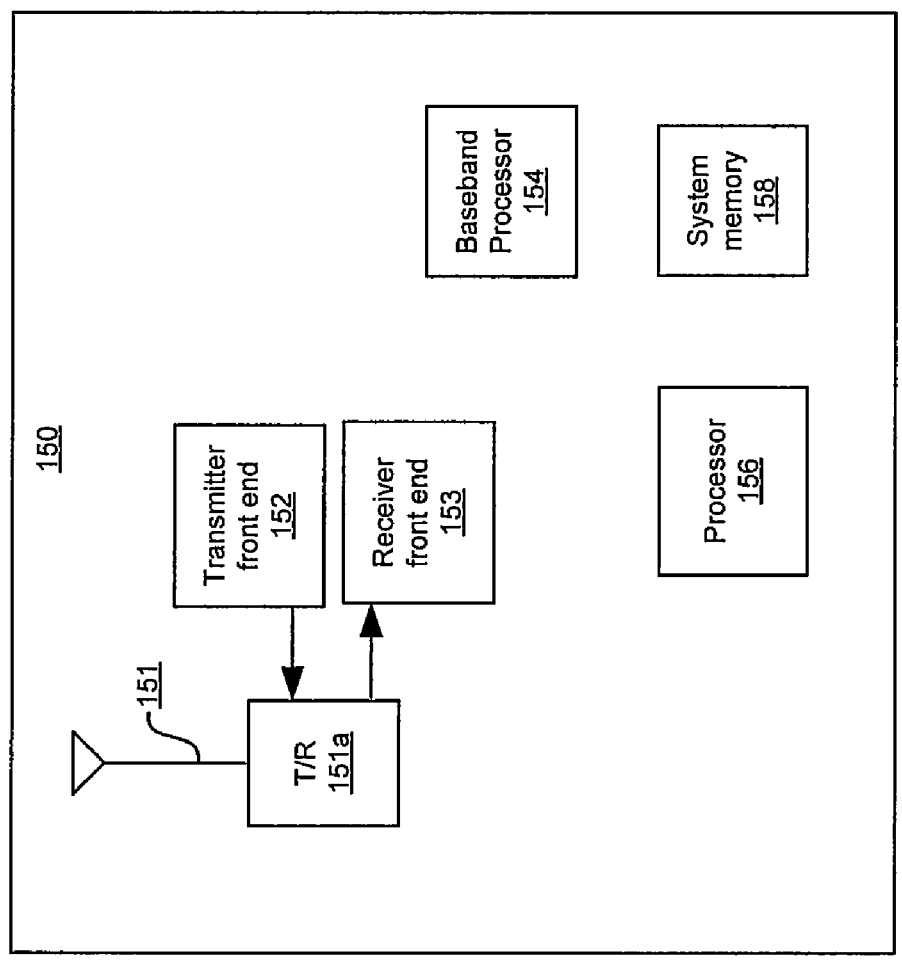
FIG. 1 is a block diagram of an exemplary wireless system, in accordance with an embodiment of the invention.

FIG. 1 is a block diagram of an exemplary wireless system, in accordance with an embodiment of the invention. Referring to FIG. 1, the wireless system 150 may comprise an antenna 151, a transmitter/receiver switch 151a, a transmitter front end 152, a receiver front end 153, a baseband processor 154, a processor 156, and a system memory 158. The transmitter/receiver (T/R) switch 151a may comprise suitable circuitry that enables the antenna 151 to be used for both receiving and transmitting. The transmitter front end (TFE) 152 may comprise suitable logic, circuitry, and/or code that may be adapted to up-convert a baseband signal directly to a radio frequency (RF) signal and to transmit the RF signal via the antenna 151. The TFE 152 may also be adapted to up-convert a baseband signal to an IF signal, and/or up-convert the IF signal to a RF signal and then transmit the RF signal via the antenna 151. The TFE 152 may use, for example, a local oscillator signal for up-conversion. A single voltage controlled oscillator (VCO) or a phase locked loop (PLL) may provide a base signal to the TFE 152, where the TFE 152 may generate one or more local oscillator signals via one or more local oscillator generators. The TFE 152 may be adapted to execute other functions, for example, filtering the baseband signal, and/or amplifying the baseband signal.

The receiver front end (RFE) 153 may comprise suitable logic, circuitry, and/or code that may be adapted to down-convert an RF signal directly to a baseband signal for further processing. The RFE 153 may also be adapted to down-convert a RF signal to an intermediate frequency (IF) signal, and/or down-convert the IF signal to a baseband signal for further processing. The RFE 153 may use, for example, a local oscillator signal for down-conversion. The RFE 153 may use, for example, a local oscillator signal for the up-conversion. A single voltage controlled oscillator (VCO) or a phase locked loop (PLL) may provide a base signal to the RFE 153, where the RFE 153 may generate one or more local oscillator signals via one or more local oscillator generators. The RFE 153 may be adapted to execute other functions, for example, filtering the baseband signal, and/or amplifying the baseband signal.

The baseband processor 154 may comprise suitable logic, circuitry, and/or code that may be adapted to process baseband signals, for example, convert a digital signal to an analog signal, and/or vice-versa. The baseband processor 154 may also provide control, for example, for one or more local oscillator generators in order that they may generate local oscillator signals at appropriate frequencies. The baseband processor 154 may also provide appropriate control to a VCO or a PLL that may provide the base signal for the local oscillator generators. The local oscillator generators are described in more detail with respect to FIGS. 3-9. The processor 156 may be a suitable processor or controller such as a central processing unit (CPU) or digital signal processor (DSP), or any type of integrated circuit processor.

The processor 156 may comprise suitable logic, circuitry, and/or code that may be adapted to control the operations of the TFE 152 and/or the baseband processor 154. For example, the processor 156 may be utilized to update and/or modify programmable parameters and/or values in a plurality of components, devices, and/or processing elements in the TFE 152 and/or the baseband processor 154. The processor 156 may also provide control, for example, for one or more local oscillator generators in order that they may generate local oscillator signals at appropriate frequencies. The processor 156 may also provide appropriate control to a VCO or a PLL that may provide the base signal for the local oscillator generators. The VCO or the PLL, and the local oscillator generators are described in more detail with respect to FIGS. 3-9. Furthermore, if the wireless system 150 comprises more than one processor, control and/or data information, which may include the programmable parameters, may be transferred from at least one controller and/or processor to the processor 156. Similarly, the processor 156 may be adapted to transfer control and/or data information, which may include the programmable parameters, to at least one controller and/or processor, which may be part of the wireless system 150.

The processor 156 may utilize the received control and/or data information, which may comprise the programmable parameters, to determine an operating mode of the TFE 152. For example, the processor 156 may be utilized to select a specific frequency for a local oscillator generator, or a specific gain for a variable gain amplifier. Moreover, the specific frequency selected and/or parameters needed to calculate the specific frequency, and/or the specific gain value and/or the parameters needed to calculate the specific gain, may be stored in the system memory 158 via the processor 156. The information stored in system memory 158 may be transferred to the TFE 152 from the system memory 158 via the processor 156. The system memory 158 may comprise suitable logic, circuitry, and/or code that may be adapted to store a plurality of control and/or data information, including parameters needed to calculate frequencies and/or gain, and/or the frequency value and/or gain value.

Figure 2A:
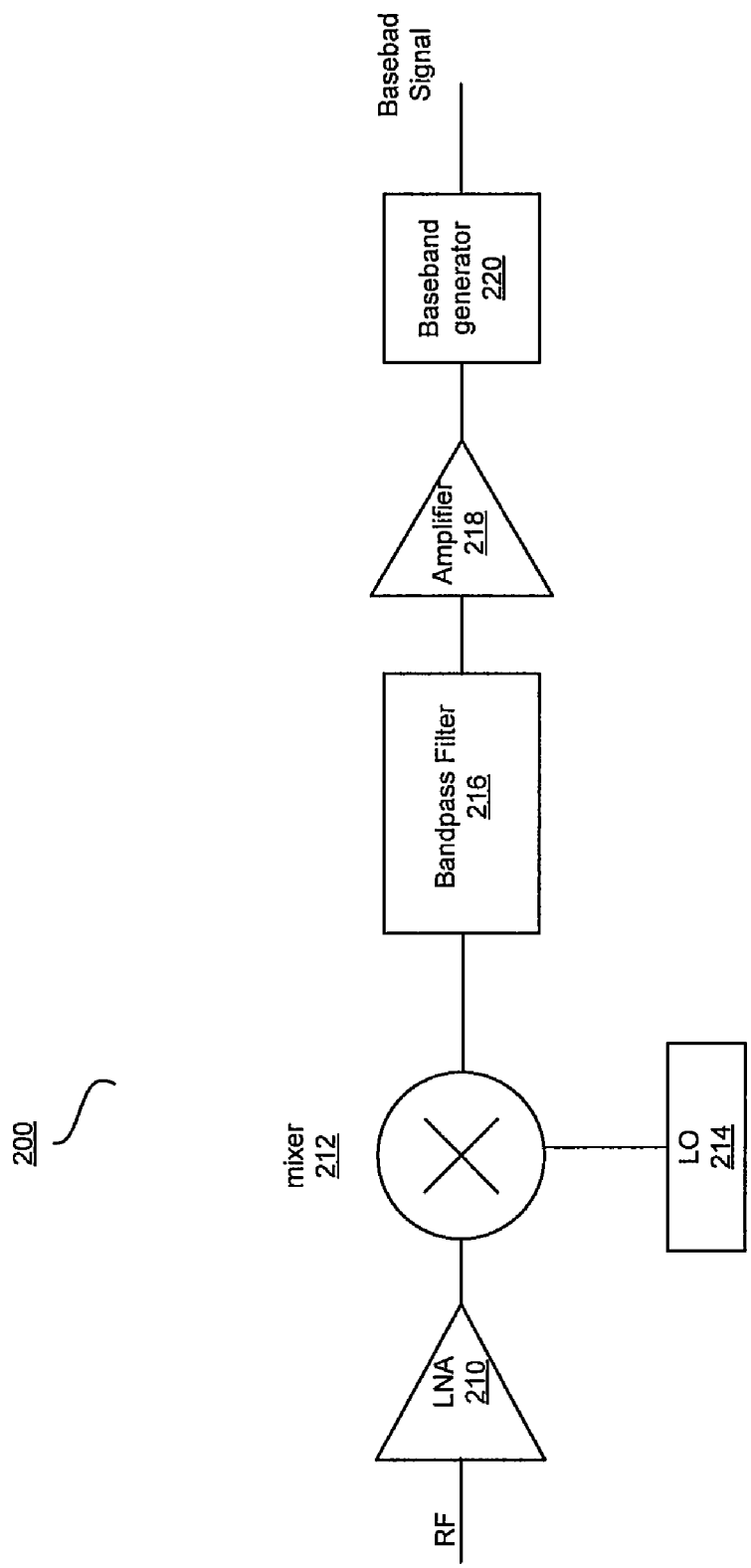
FIG. 2A is a block diagram illustrating an exemplary RF receiver front end, in accordance with an embodiment of the invention.

FIG. 2A is a block diagram illustrating an exemplary RF receiver front end, in accordance with an embodiment of the invention. Referring to FIG. 2A, there is shown an exemplary receive path 200 that comprises amplifiers 210 and 218, a mixer 212, a local oscillator (LO) generator 214, a bandpass filter 216, and a baseband generator 220. The amplifiers 210 and 218 may comprise suitable logic, circuitry, and/or code that may be adapted to amplify input signals and output the amplified signals. The amplifier 210 and/or the amplifier 218 may be a low noise amplifier (LNA). An LNA may be utilized in instances where the signal-to-noise ratio (SNR) may be relatively low, such as, for example, RF signals received by an antenna. The amplifiers 210 and 218 may also be variable gain amplifiers, where the gain control may be, for example, under a programmable control of a processor 156.

The mixer 212 may comprise suitable logic, circuitry, and/or code that may be adapted to receive two input signals, and generate output signals, where the output signals may be a difference of the frequencies of the two input signals and a sum of the frequencies of the two input signals.

The LO 214 may comprise suitable logic, circuitry, and/or code that may be adapted to output a signal of a specific frequency. The LO 214 is described in more detail with respect to FIGS. 3-8. The bandpass filter 216 may comprise suitable logic, circuitry, and/or code that may be adapted to selectively pass signals within a certain bandwidth while attenuating signals outside that bandwidth.

The baseband generator 220 may comprise suitable logic, circuitry, and/or code that may be adapted to generate analog baseband signal from the IF signal communicated by the amplifier 218. For example, analog down-conversion of the IF signal to analog baseband signal may comprise using a mixer (not shown) similar to the mixer 212. If the baseband processor 154 (FIG. 1) is a digital baseband processor, the analog baseband signal may be converted to digital signal and communicated to the baseband processor 154. An analog-to-digital converter (ADC) (not shown) may be utilized to digitize the analog IF signal.

Digital down-conversion may comprise digitizing the IF signal, processing the digitized IF signal, for example, filtering and down-converting, to generate a digital baseband signal, which may then be communicated to the baseband processor 154. If the baseband processor 154 is an analog baseband processor, the digital baseband signal may be converted to analog baseband signal and communicated to the baseband processor 154. A digital-to-analog converter (DAC) (not shown) may be utilized to convert the digital IF signal. The down-conversion of the digital IF signal to the digital baseband signal may utilize, for example, decimation filters where the input frequency of the decimation filter may be a multiple of the output frequency of the decimation filter. The digital filtering of the digital samples may utilize a derotator that may utilize a coordinate rotation digital calculation (CORDIC) algorithm.

In operation, the RF signal, which may have a carrier frequency referred to as $f_{RF}$, may be received by an antenna and communicated to the amplifier 210, where the RF signal may be amplified by the amplifier 210. The amplified RF signal may be communicated to an input of the mixer 212. The output signal of the LO 214, which may have a frequency of $f_{LO}=f_{RF}+f_{IF}$ or $f_{LO}=f_{RF}-f_{IF}$, may be communicated to another input of the mixer 212, where $f_{IF}$ may be a desired intermediate frequency. The mixer 212 may process the two input signals such that the output signal may have a desired frequency. The mixer 212 output signal may be referred to as an IF signal.

The IF signal may be communicated to a bandpass filter 216, which may be adapted to pass the desired bandwidth of signals about the IF frequency $f_{IF}$, while attenuating the undesired frequencies in the IF signal. The filtered IF signal may be amplified by the amplifier 218, and the amplified IF signal may be communicated to the baseband generator 220. The baseband signal output by the baseband generator 220 may be communicated to the baseband processor 154 for further processing. The processing may comprise, for example, filtering and/or amplifying.

Figure 2B:
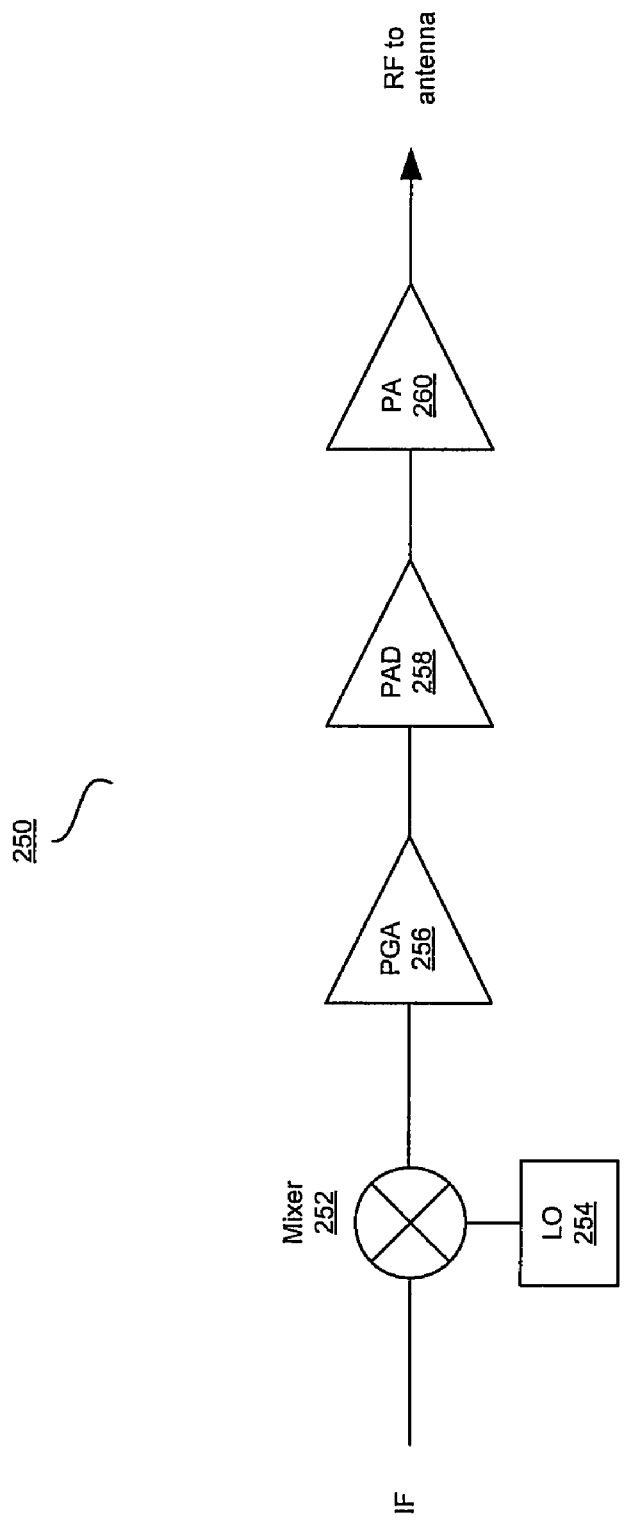
FIG. 2B is a block diagram illustrating an exemplary RF transmitter front end, in accordance with an embodiment of the invention.

FIG. 2B is a block diagram illustrating an exemplary RF transmitter front end, in accordance with an embodiment of the invention. Referring to FIG. 2B, there is shown an exemplary transmit path 250 that comprises a mixer 252, a local oscillator (LO) generator 254, a programmable gain amplifier (PGA) 256, a power amplifier driver (PAD) 258, and a power amplifier (PA) 260. The mixer 252 may upconvert a baseband signal to RF signal used for transmission using a mixing signal from the LO 254. The LO 254 is described in more detail with respect to FIGS. 3-8. The PGA 256 may amplify an input signal with variable gain to generate an output signal. The gain of the PGA 256 may be adjusted by circuitry and/or a processor, such as, for example, the baseband processor 154 or the processor 156. The PAD 258 and the PA 260 may each amplify an input signal to generate an output signal.

In operation, the input signal to the mixer 252 may be upconverted to radio frequency (RF), and the RF signal from the outputs of the mixer 252 may be communicated to the PGA 256. The mixer 252, the PGA 256, the PAD 258, and the PA 260 may comprise devices that amplify signals, for example. Accordingly, the RF signal may be amplified to a level sufficient for transmission.

Figure 3:
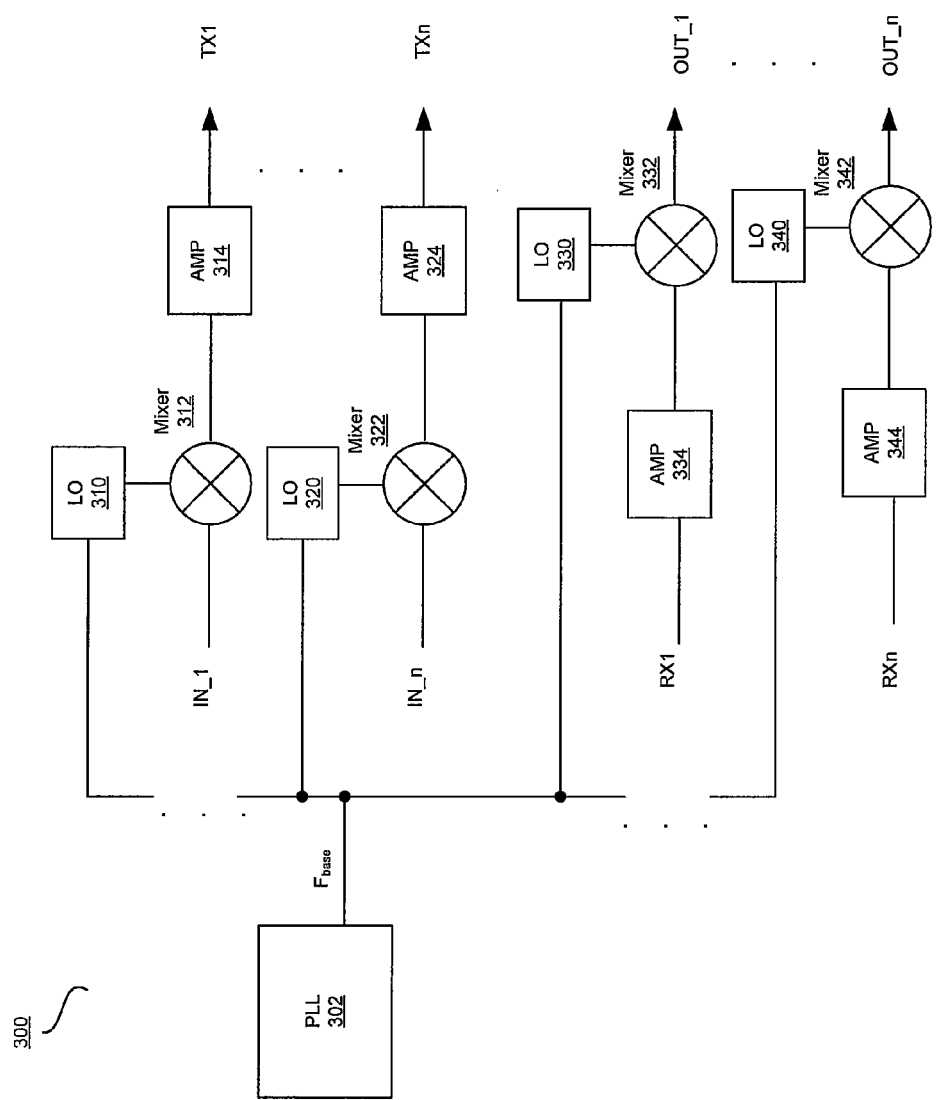
FIG. 3 is an exemplary block diagram illustrating utilization of a single PLL to clock an array of DDFS for multi-protocol applications, in accordance with an embodiment of the invention.

FIG. 3 is an exemplary block diagram illustrating utilization of a single PLL to clock an array of DDFS for multi-protocol applications, in accordance with an embodiment of the invention. Referring to FIG. 3, there is shown a RF front end 300 that comprises a portion of the transmitter front end 152 and a portion of the receiver front end 153. The RF front end 300 may comprise a PLL 302, local oscillator generators 310, 320, 330, and 340, mixers 312, 322, 332, and 342, and amplifiers 314, 324, 334, and 344. Various exemplary embodiments of the local oscillator generators 310, 320, 330, and 340 are described with respect to FIGS. 4-8.

In operation, a frequency source, such as, for example, the PLL 302 may generate a signal $F_{base}$, where the signal $F_{base}$ may be communicated to the local oscillator generators 310, 320, 330, and 340. The local oscillator generators 310, 320, 330, and 340 may each generate local oscillator signals based on the input signal $F_{base}$. The local oscillator signals may be used, for example, for various applications that may use different carriers for transmission and/or reception. For example, the local oscillator generator 310 may generate a local oscillator signal that may be used by the mixer 312 for up-converting a baseband signal for WiFi transmission. The up-converted signal may be amplified, for example, by the amplifier 314 for transmission. The local oscillator generator 330 may generate a local oscillator signal for WiFi reception if a different carrier frequency is used for WiFi reception. The local oscillator signal generated by the local oscillator generator 330 may be used, for example, by the mixer 332 for down-converting an RF signal that may have been received, and amplified by the amplifier 334.

Similarly, the local oscillator generators 320 and 340 may generate local oscillator signals that may be used for transmission and/or reception for another wireless carrier frequency. Accordingly, the single PLL 302 may generate a single signal $F_{base}$ that may be used independently by each of a plurality of local oscillator generators 310, 320, 330, ..., 340 to generate various local oscillator signals at different frequencies.

While an embodiment of the invention may have described a frequency source as the PLL 302, the invention need not be so limited. For example, other frequency sources, where the frequency of the generated signal may be variable or not, may also be used.

Figure 4:
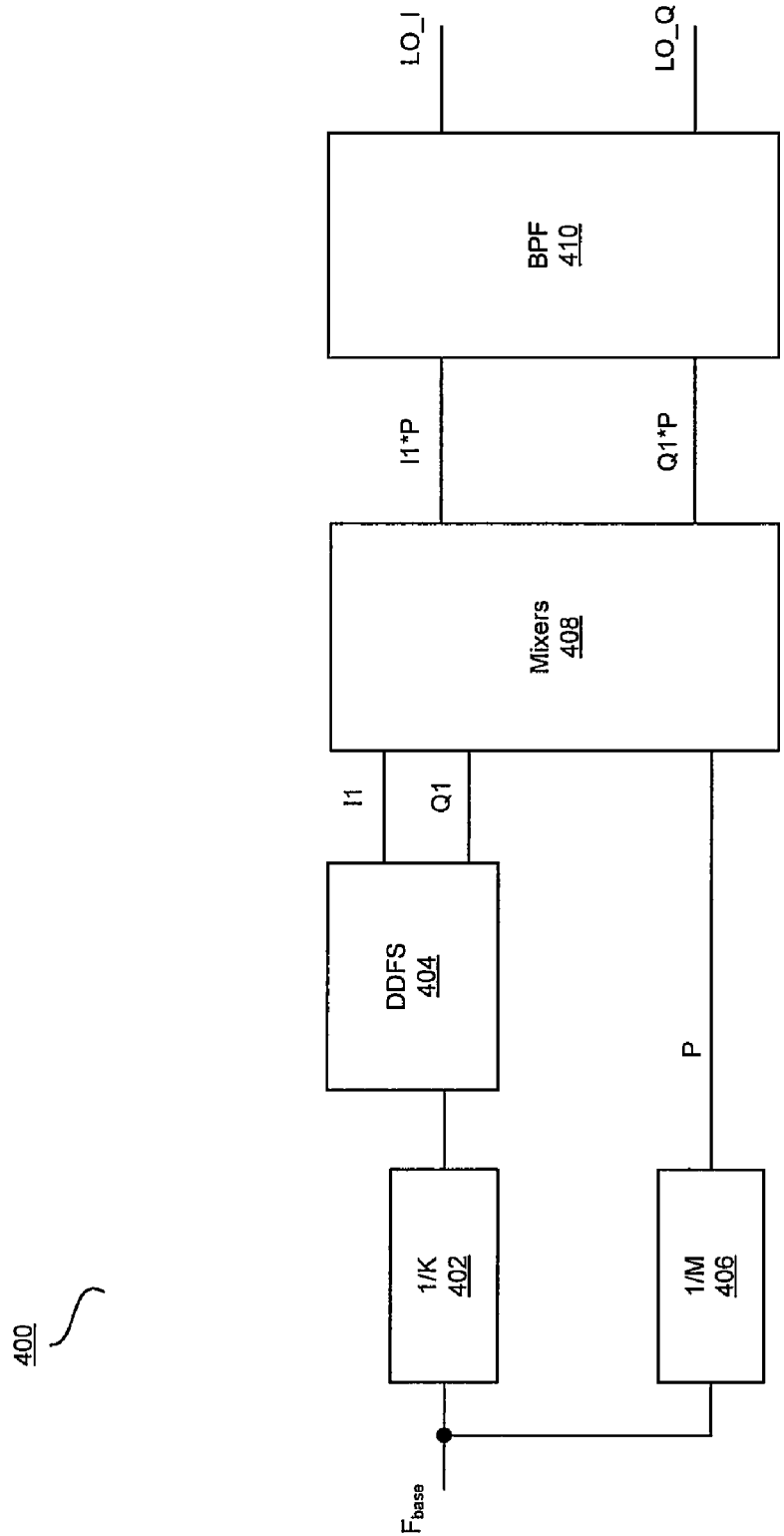
FIG. 4 is a block diagram illustrating use of a programmable local oscillator generator utilizing DDFS up to extremely high frequencies, in accordance with an embodiment of the invention.

FIG. 4 is a block diagram illustrating use of a programmable local oscillator generator utilizing DDFS up to extremely high frequencies, in accordance with an embodiment of the invention. Referring to FIG. 4, there is shown a local oscillator generator 400 comprising divider blocks 402 and 406, DDFS 404, mixer block 408, and bandpass filter block 410.

The divider blocks 402 and 406 may comprise suitable logic, circuitry, and/or code that may enable receiving an input signal and generating an output signal whose frequency may be divided by a divide factor N, where N may be 1 or more. The DDFS 404 may comprise suitable logic, circuitry, and/or code that may enable generating a signal, where a frequency of the signal may be controlled. The DDFS 404 may output in-phase and quadrature phase signals. The frequencies of the signals generated by the DDFS 404 may be controlled by, for example, a processor such as the baseband processor 154 and/or the processor 156. Operation of an exemplary DDFS is discussed with respect to FIG. 8.

The mixer block 408 may comprise suitable circuitry that may enable mixing two signals to generate an output signal that may comprise, for example, an in-phase component and a quadrature phase component, where each of the components may comprise a sum of frequencies of the two signals and a difference of the two signals. The bandpass filter block 410 may comprise suitable logic and/or circuitry that may enable selecting, for all input signals, a particular spectrum of frequencies to pass with minimum attenuation while attenuating frequencies outside that spectrum. The bandpass filter block 410 may be controlled, for example, by the processor 156 and/or the baseband processor 154, to pass certain frequencies.

In operation, the signal $F_{base}$ generated by, for example, the PLL 302 may be communicated to the divider blocks 402 and 406. The divider block 402 may divide the frequency of the signal $F_{base}$ by an appropriate divide factor and communicate the reduced frequency signal to the DDFS 404. The DDFS 404 may receive the signal from the divider block 402 and may output an in-phase signal I1 and a quadrature phase signal Q1. The signals I1 and Q1, which may be represented by sin(A) and cos(A), respectively, may be communicated to the mixer block 404. The divider block 406 may divide the frequency of the signal $F_{base}$ by an appropriate divide factor and communicate the reduced frequency signal P to the mixer block 408. The signal P, which may be represented as cos(B), may be communicated to the mixer block 408.

The mixer block 408 may output signals I1*P and Q1*P that may be represented as sin(A)*cos(B) and cos(A)*cos(B), respectively. By using trigonometric identity equations, these signals may be represented as:

$$I1*P = \sin(A)*\cos(B) = \frac{1}{2}[\sin(A+B)+\sin(A-B)] \quad [1]$$

$$Q1*P = \cos(A)*\cos(B) = \frac{1}{2}[\cos(A+B)+\cos(A-B)] \quad [2]$$

Accordingly, the signals output by the mixer block 408 may be 90° out of phase with each other. The signals output by the mixer block 408 may comprise an upper sideband, or a sum of the frequencies of the signals I1/Q1 and P, and a lower sideband, or a difference of the frequencies of the signals I1/Q1 and P.

The signals I1*P and Q1*P may be communicated to the bandpass filter block 410. The bandpass filter block 410 may filter the input signals appropriately to output either the upper sideband or the lower sideband. The outputs of the bandpass filter block 410, LO_I and LO_Q, may have the same frequencies while the phase may be different by 90°. The local oscillator signals LO_I and LO_Q may be used by RF receiver front end and/or a transmitter front end, as shown, for example, with respect to FIG. 3.

The U.S. patent application Ser. No. 11/864,829 filed Sep. 28, 2007, which is filed on even date herewith, discloses a programmable local oscillator generator utilizing a DDFS for extremely high frequencies, for example, and is hereby incorporated herein by reference.

Figure 5:
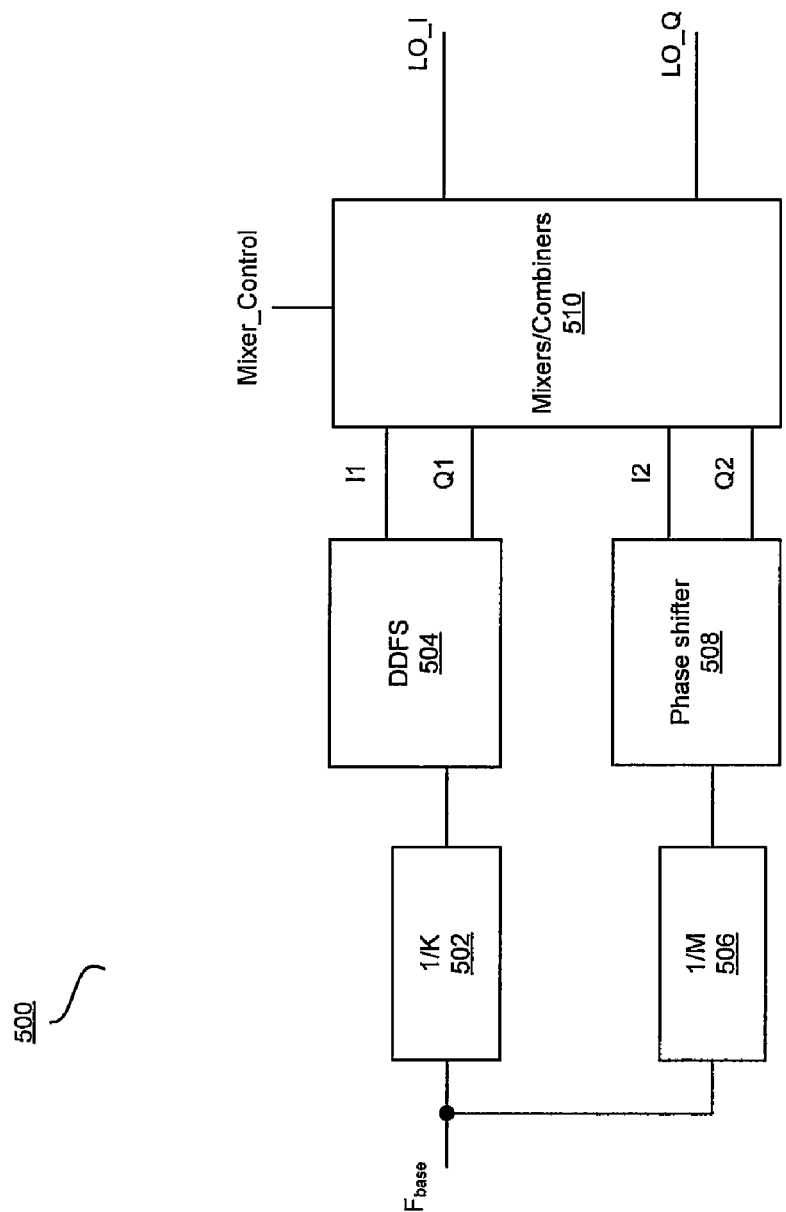
FIG. 5 is a block diagram illustrating use of a quadrature local oscillator generator utilizing DDFS up to extremely high frequencies, in accordance with an embodiment of the invention.

FIG. 5 is a block diagram illustrating use of a quadrature local oscillator generator utilizing DDFS up to extremely high frequencies, in accordance with an embodiment of the invention. Referring to FIG. 5, there is shown a local oscillator generator 500 comprising divider blocks 502 and 506, DDFS 504, a phase shifter block 508, and a mixer-combiner block 510. The divider blocks 502 and 506, and the DDFS 504 may be similar to the corresponding circuitry described with respect to FIG. 4. The phase shifter block 508 may comprise suitable logic and/or circuitry that may enable receiving an input signal and generating an output signal comprising an in-phase component and a quadrature phase component, where the two components may be 90° out of phase with respect to each other.

The mixer-combiner block 510 may comprise suitable circuitry that may enable mixing signals to generate, for example, internal signals that may comprise two input signals multiplied together. The mixer-combiner block 510 may also control phases of the internal signals, and then combine the internal signals to generate output signals. The output signals may be, for example, in-phase and quadrature phase components of a local oscillator signal.

In operation, the PLL 302 may communicate a signal to the divider blocks 502 and 506. The divider block 502 may divide the frequency of the input signal by an appropriate divide factor and communicate the reduced frequency signal to the DDFS 504. The divider block 506 may divide the frequency of the input signal by an appropriate divide factor and communicate the reduced frequency signal to the phase shifter block 508.

The DDFS 504 may receive the signal from the divider block 502 and may output a signal that comprises an in-phase component I1 and a quadrature phase component Q1. The in-phase component I1 and the quadrature phase component Q1 may be communicated to the mixer-combiner block 510. The phase shifter block 508 may receive a signal from the divider block 506 and output an in-phase component I2 and a quadrature phase component Q2. The in-phase component I2 and the quadrature phase component Q2 may be communicated to the mixer-combiner block 510.

The I1 and I2 components may be described as, for example, sin(A) and sin(B), and the Q1 and Q2 components may be described as, for example, cos(A) and cos(B). Accordingly, the mixer-combiner block 510 may multiply the components I1 and Q2 to result in a signal I1*Q2 that may be represented as sin(A)cos(B). The mixer-combiner block 510 may multiply the components I2 and Q1 to result in an output signal I2*Q1 that may be represented as sin(B)cos(A). The mixer-combiner block 510 may multiply the components I1 and I2 to result in a signal I1*I2 that may be written as sin(A)sin(B). The mixer-combiner block 510 may multiply the components Q1 and Q2 to result in a signal Q1*Q2 that may be written as cos(A)cos(B).

The mixer-combiner block 510 may then combine the signals I1*Q2 and I2*Q1 to generate an in-phase component LO_I of a local oscillator signal. The mixer-combiner block 510 may also combine the signals I1*I2 and Q1*Q2 to generate a quadrature phase component LO_Q of the local oscillator signal. By using trigonometric identities, the signals I1*Q2 and I2*Q1 may be combined as follows:

$$\begin{aligned} LO\_I &= I1*Q2 + I2*Q1 = \sin(A)\cos(B) + \sin(B)\cos(A) \quad [2] \\ &= 1/2[\sin(A+B)+\sin(A-B)] + \\ &\quad 1/2[\sin(B+A)+\sin(B-A)] \\ &= \sin(A+B). \end{aligned}$$

The signals I1*Q2 and I2*Q1 may also be combined as follows:

$$\begin{aligned} LO\_I &= -(I1*Q2) + I2*Q1 = -[\sin(A)\cos(B)] + \sin(B)\cos(A) \quad [3] \\ &= -1/2[\sin(A+B)+\sin(A-B)] + \\ &\quad 1/2[\sin(B+A)+\sin(B-A)] \\ &= \sin(A-B). \end{aligned}$$

Similarly, the signals I1*I2 and Q1*Q2 may be combined as follows:

$$\begin{aligned} LO\_Q &= -[I1*I2] + Q1*Q2 = -[\sin(A)\sin(B)] + \cos(A)\cos(B) \quad [4] \\ &= 1/2[\cos(A+B)-\cos(A-B)] + \\ &\quad 1/2[\cos(A+B)+\cos(A-B)] \\ &= \cos(A+B). \end{aligned}$$

The signals I1*Q2 and I2*Q1 may also be combined as follows:

$$\begin{aligned} LO\_I &= I1*I2 + Q1*Q2 = \sin(A)\sin(B) + \cos(A)\cos(B) \quad [5] \\ &= -1/2[\sin(A+B)+\sin(A-B)] + \\ &\quad 1/2[\sin(B+A)+\sin(B-A)] \\ &= \sin(A-B). \end{aligned}$$

Accordingly, by appropriately inverting or not inverting the signal (I1*Q2) and the signal (I1*I2), the components LO_I and LO_Q may comprise either the sum of the frequencies A and B or the difference of the frequencies A and B. The signal (I1*I2) may be inverted while the signal (I1*Q2) may not be inverted, for example, when a signal Mixer_Control is unasserted. When the signal Mixer_Control is asserted, the signal (I1*Q2) may be inverted while the signal (I1*I2) may not be inverted. The signal Mixer_Control may be communicated by, for example, the processor 156 and/or the baseband processor 154. The local oscillator signals LO_I and LO_Q may be used by RF receiver front end and/or a transmitter front end, as shown, for example, with respect to FIG. 3.

The U.S. patent application Ser. No. 11/864,837 filed Sep. 28, 2007, which is filed on even date herewith, discloses a programmable local oscillator generator utilizing a DDFS for extremely high frequencies, for example, and is hereby incorporated herein by reference.

Figure 6:
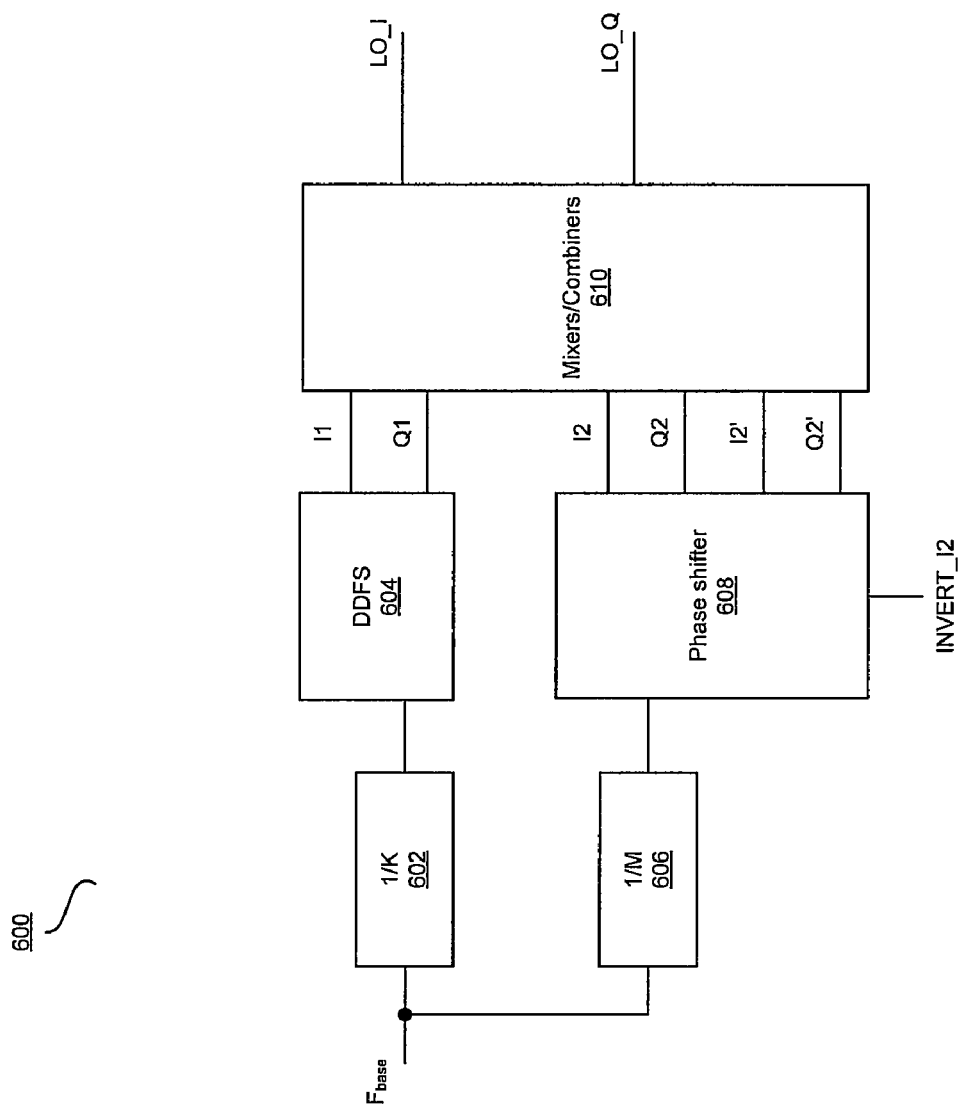
FIG. 6 is a block diagram illustrating use of a local oscillator generator based on quadrature mixing using a phase shifter, in accordance with an embodiment of the invention.

FIG. 6 is a block diagram illustrating use of a local oscillator generator based on quadrature mixing using a phase shifter, in accordance with an embodiment of the invention. Referring to FIG. 6, there is shown a local oscillator generator 600 comprising divider blocks 602 and 606, DDFS 604, a phase shifter block 608, and a mixer-combiner block 610. The divider blocks 602 and 606, and the DDFS 604 may be similar to the corresponding circuitry described with respect to FIG. 4. The phase shifter block 608 may comprise suitable logic and/or circuitry that may enable receiving an input signal and generating an output signal that may comprise an in-phase (I) component and a quadrature phase (Q) component where the two components may be 90° out of phase with respect to each other. The phase shifter block 608 may also generate two other signals I' and Q', where each of the signals I' and Q' may be controlled to be either in-phase or 180° out of phase with respect to the I component and Q component, respectively.

The mixer-combiner block 610 may comprise suitable circuitry that may enable mixing signals to generate, for example, internal signals that may comprise two input signals multiplied together. The mixer-combiner block 610 may also combine the internal signals to generate output signals. The output signals may be, for example, in-phase and quadrature phase components of a local oscillator signal.

In operation, the PLL 302 may communicate a signal to the divider blocks 602 and 606. The divider block 602 may divide the frequency of the input signal by an appropriate divide factor and communicate the reduced frequency signal to the DDFS 604. The divider block 606 may divide the frequency of the input signal by an appropriate divide factor and communicate the reduced frequency signal to the phase shifter block 608.

The DDFS 604 may receive the signal from the divider block 602 and may output a signal that comprises an in-phase component I1 and a quadrature phase component Q1. The in-phase component I1 may be communicated to the mixer-combiner block 610, and the quadrature phase component Q1 may be communicated to the mixer-combiner block 610. The phase shifter block 608 may receive a signal from the divider block 606 and output an in-phase signal component I2 and a quadrature phase signal component Q2. The phase shifter block 608 may also generate a signal I2' and a signal Q2'. The signal I2' may be controlled to be either in phase with the signal component I2 or 180° out of phase with respect to the signal component I2. Similarly, the signal Q2' may be controlled to be either in phase with the signal component Q2 or 180° out of phase with respect to the signal component Q2. A signal that is 180° out of phase with respect to an original signal may be referred to as an inverted version of the original signal.

The phase of the signals I2' and Q2' may be controlled by, for example, the signal INVERT_I2, which may be communicated by, for example, the processor 156 and/or the baseband processor 154. An embodiment of the invention may enable generation of the signals I2' and Q2' such that when the signal I2' is an inverted version of the signal component I2, the signal Q2' may be a non-inverted version of the signal component Q2, and when the signal I2' is a non-inverted version of the signal component I2, the signal Q2' may be an inverted version of the signal component Q2. The signal components I2, Q2, and the signals I2' and Q2' may be communicated to the mixer-combiner block 610.

The I1 and I2 signal components may be described as, for example, $\sin(A)$ and $\sin(B)$, respectively, and the Q1 and Q2 signal components may be described as, for example, $\cos(A)$ and $\cos(B)$, respectively. The signal I2' may be described as $\sin(B)$ if it is not inverted and $[-\sin(B)]$ if it is inverted. Similarly, the signal Q2' may be described as $\cos(B)$ if it is not inverted and $[-\cos(B)]$ if it is inverted.

The mixer-combiner block 610 may multiply the signals I1 and Q2' to result in a signal I1*Q2'. The mixer-combiner block 610 may multiply the signals I2 and Q1 to result in an signal I2*Q1 that may be written as $\sin(B)\cos(A)$. The mixer-combiner block 610 may multiply the components I1 and I2' to result in a signal I1*I2'. The mixer-combiner block 610 may multiply the components Q1 and Q2 to result in a signal Q1*Q2 that may be written as $\cos(A)\cos(B)$.

The mixer-combiner block 610 may then combine the signals I1*Q2' and I2*Q1 to generate an in-phase component LO_I of a local oscillator signal. The mixer-combiner block 610 may also combine the signals I1*I2' and Q1*Q2 to generate a quadrature phase component LO_Q of the local oscillator signal. By using trigonometric identities, the signals I1*Q2' and I2*Q1 may be combined as follows:

$$LO\_I = I1*Q2 + I2*Q1 = \sin(A)\cos(B) + \sin(B)\cos(A) \quad [2]$$
$$= 1/2[\sin(A+B) + \sin(A-B)] +$$
$$\quad 1/2[\sin(B+A) + \sin(B-A)]$$
$$= \sin(A+B).$$

The signals I1*Q2' and I2*Q1 may also be combined as follows:

$$LO\_I = I1*Q2' + I2*Q1 = \sin(A)[-\cos(B)] + \sin(B)\cos(A) \quad [3]$$
$$= -1/2[\sin(A+B) + \sin(A-B)] +$$
$$\quad 1/2[\sin(B+A) + \sin(B-A)]$$
$$= \sin(A-B).$$

Accordingly, by controlling a phase of the signal Q2' to be the same as the phase of the component Q2, the component LO_I may have a frequency that is a sum of the frequencies of the input signals. Similarly, by controlling a phase of the signal Q2' to be 180° out of phase with respect to the component Q2, the component LO_I may have a frequency that is a difference of the frequencies of the input.

Similarly, the signals I1*I2' and Q1*Q2 may be combined as follows:

$$LO\_Q = I1 * I2' + Q1 * Q2 = \sin(A)[-\sin(B)] + \cos(A)\cos(B) \quad [4]$$
$$= 1/2[\cos(A+B) - \cos(A-B)] +$$
$$1/2[\cos(A+B) + \cos(A-B)]$$
$$= \cos(A+B).$$

The signals I1*I2' and Q1*Q2 may also be combined as follows:

$$LO\_I = I1 * I2 + Q1 * Q2 = \sin(A)\sin(B) + \cos(A)\cos(B) \quad [5]$$
$$= -1/2[\sin(A+B) + \sin(A-B)] +$$
$$1/2[\sin(B+A) + \sin(B-A)]$$
$$= \sin(A-B).$$

Accordingly, by appropriately inverting or not inverting the signals I2' and Q2', the components LO_I and LO_Q may comprise either the sum of the frequencies A and B or the difference of the frequencies A and B. The signal Q2' may be an inverted version of the component Q2 while the signal I2' may be a non-inverted version of the component I2, for example, when a signal INVERT_I2 is unasserted. When the signal INVERT_I2 is asserted, the signal I2' may be an inverted version of the component I2 while the signal Q2 may be a non-inverted version of the component Q2. The signal INVERT_I2 may be communicated by, for example, the processor 156 and/or the baseband processor 154. The local oscillator signals LO_I and LO_Q may be used by RF receiver front end and/or a transmitter front end, as shown, for example, with respect to FIG. 3.

The U.S. patent application Ser. No. 11/864,845 filed Sep. 28, 2007, which is filed on even date herewith, discloses a programmable local oscillator generator utilizing a DDFS for extremely high frequencies, for example, and is hereby incorporated herein by reference.

Figure 7A:
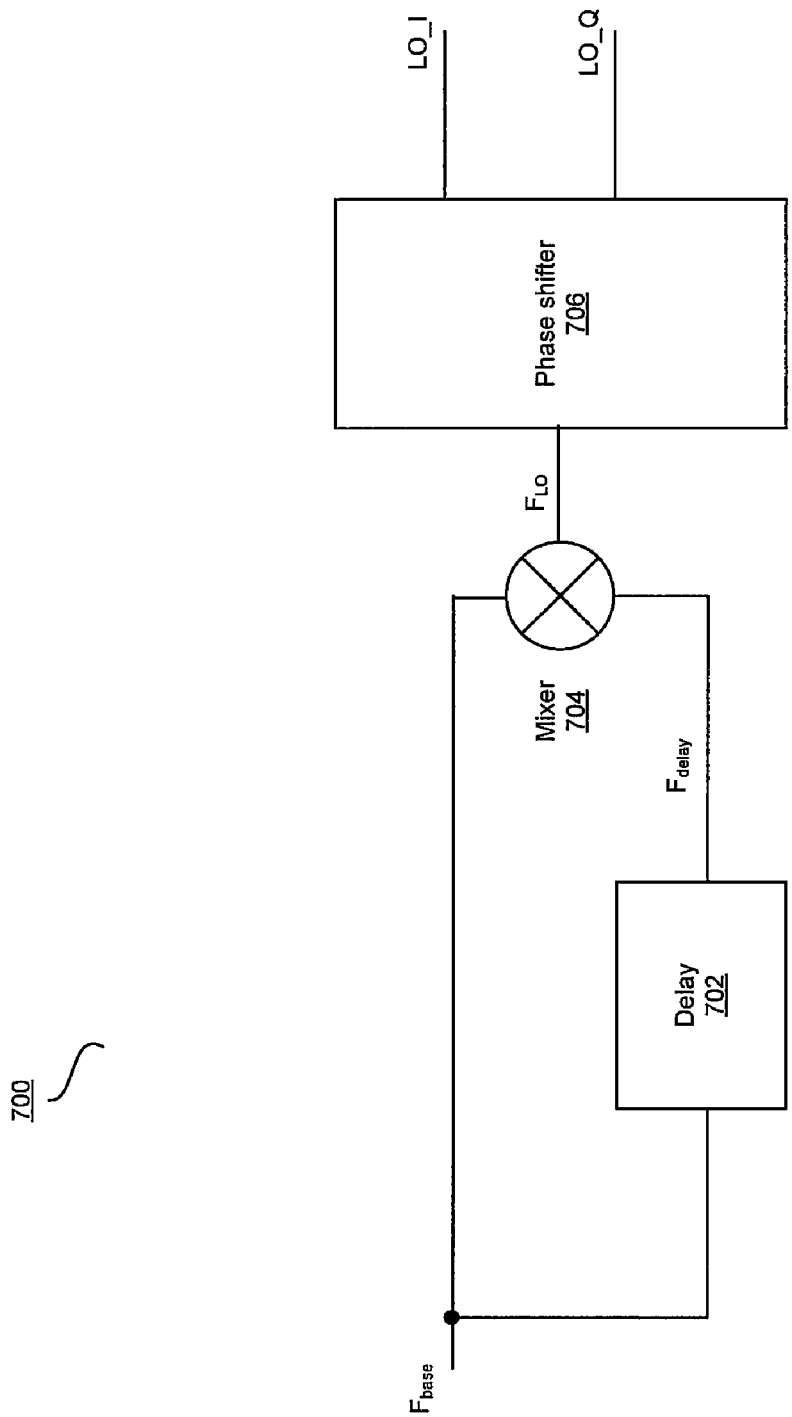
FIG. 7A is a block diagram illustrating use of a local oscillator generator based on a digital delay circuit, in accordance with an embodiment of the invention.

FIG. 7A is a block diagram illustrating use of a local oscillator generator based on a digital delay circuit, in accordance with an embodiment of the invention. Referring to FIG. 7A there is shown a local oscillator generator 700 that comprises a delay block 702, a mixer 704, and a phase shifter block 706. The delay block 702 may comprise suitable logic, circuitry, and/or code that may enable delaying an RF signal by a variable amount of time. The mixer 704 may comprise suitable circuitry that may enable mixing two input signals to generate an output signal. The phase shifter block 706 may comprise suitable logic and/or circuitry that may enable receiving an input signal and generating an output signal comprising an in-phase component and a quadrature phase component, where the two components may be 90° out of phase with respect to each other.

In operation, the input signal $F_{base}$, which may be communicated by, for example, the PLL 302, may be represented as sin(A). The input signal $F_{base}$ may be communicated to the mixer 704 and the delay block 702. The delay block 702 may enable delaying a phase of the input signal $F_{base}$ by 90°, thus generating a signal $F_{delay}$, which may be represented as cos (A). The signal $F_{delay}$ may be communicated to the mixer 704. Accordingly, the output signal of the mixer 704, $F_{LO}$, may be represented by:

$$F_{LO} = F_{base} * F_{delay} = \sin(A)\cos(A) \quad [x]$$
$$= 1/2[\sin(A+A) + \sin(A-A)]$$
$$= 1/2[\sin(2A)]$$

Accordingly, the output signal $F_{LO}$ of the mixer 704 may comprise twice the frequency of the input signals $F_{base}$ and $F_{delay}$. The local oscillator signals LO_I and LO_Q may be used by RF receiver front end and/or a transmitter front end, as shown, for example, with respect to FIG. 3.

Figure 7B:
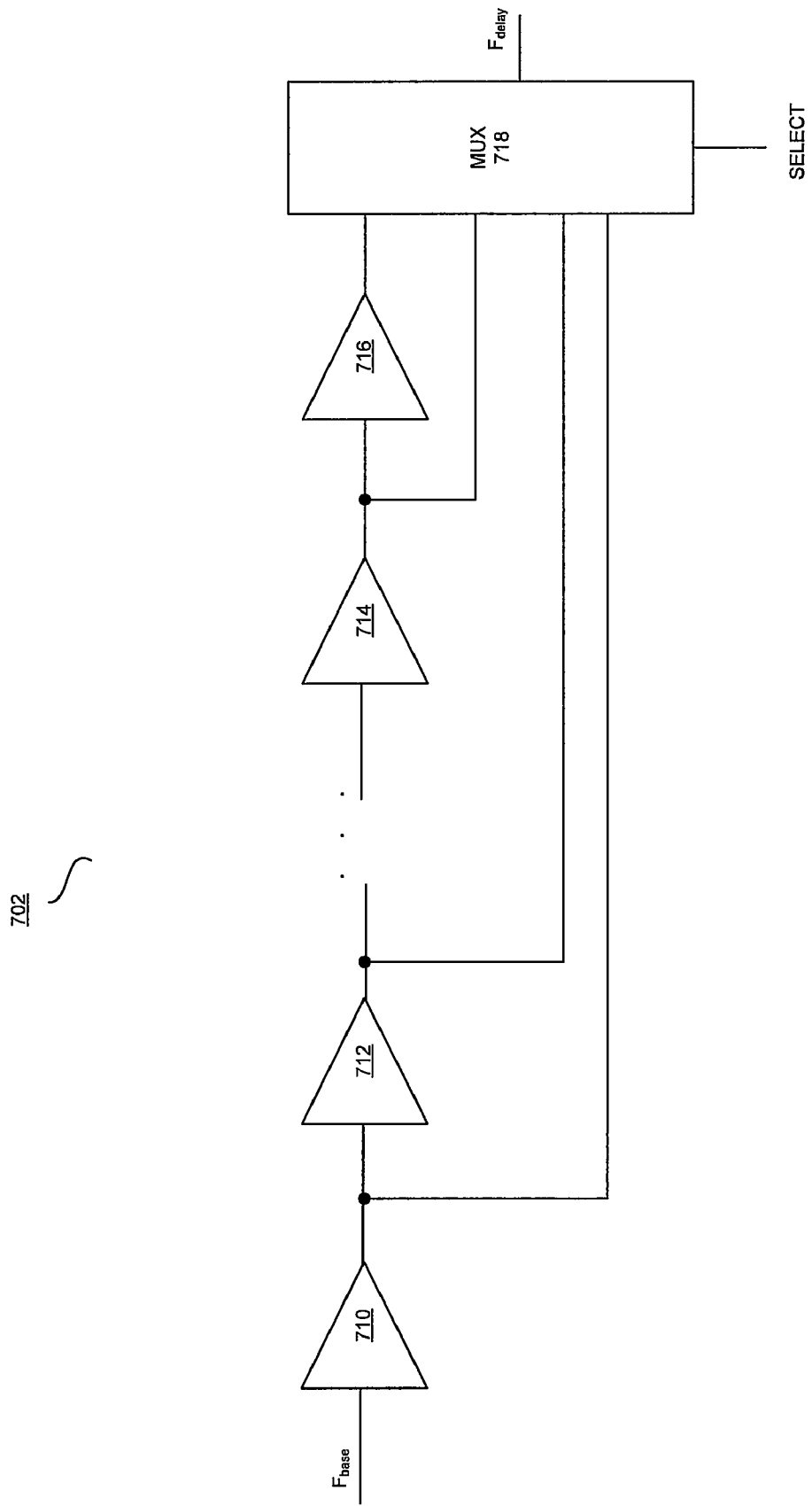
FIG. 7B is an exemplary block diagram of a digital delay circuit, in accordance with an embodiment of the invention.

FIG. 7B is an exemplary block diagram of a digital delay circuit, in accordance with an embodiment of the invention. Referring to FIG. 7B, there is shown the delay block 702 that comprises a plurality of buffers 710, 712, 714, 716, and a multiplexer 718. The input signal $F_{base}$ may propagate through the buffers 710, 712, 714, 716, and an output of each of the buffers may be coupled to the multiplexer 718. A SELECT signal may indicate which of the buffer outputs to select as an output of the multiplexer 718. The SELECT signal may be communicated by, for example, the processor 156 and/or the baseband processor 154. Accordingly, the output signal of the delay block 702 may be adjusted to a desired delay. Various embodiments of the invention may also allow further delay adjustment at one or more of the buffers 710, 712, 714, 716. For example, an output of each of the buffers may be coupled to a capacitor bank (not shown) where the capacitance of the capacitor bank may be adjusted for different delays.

Figure 8:
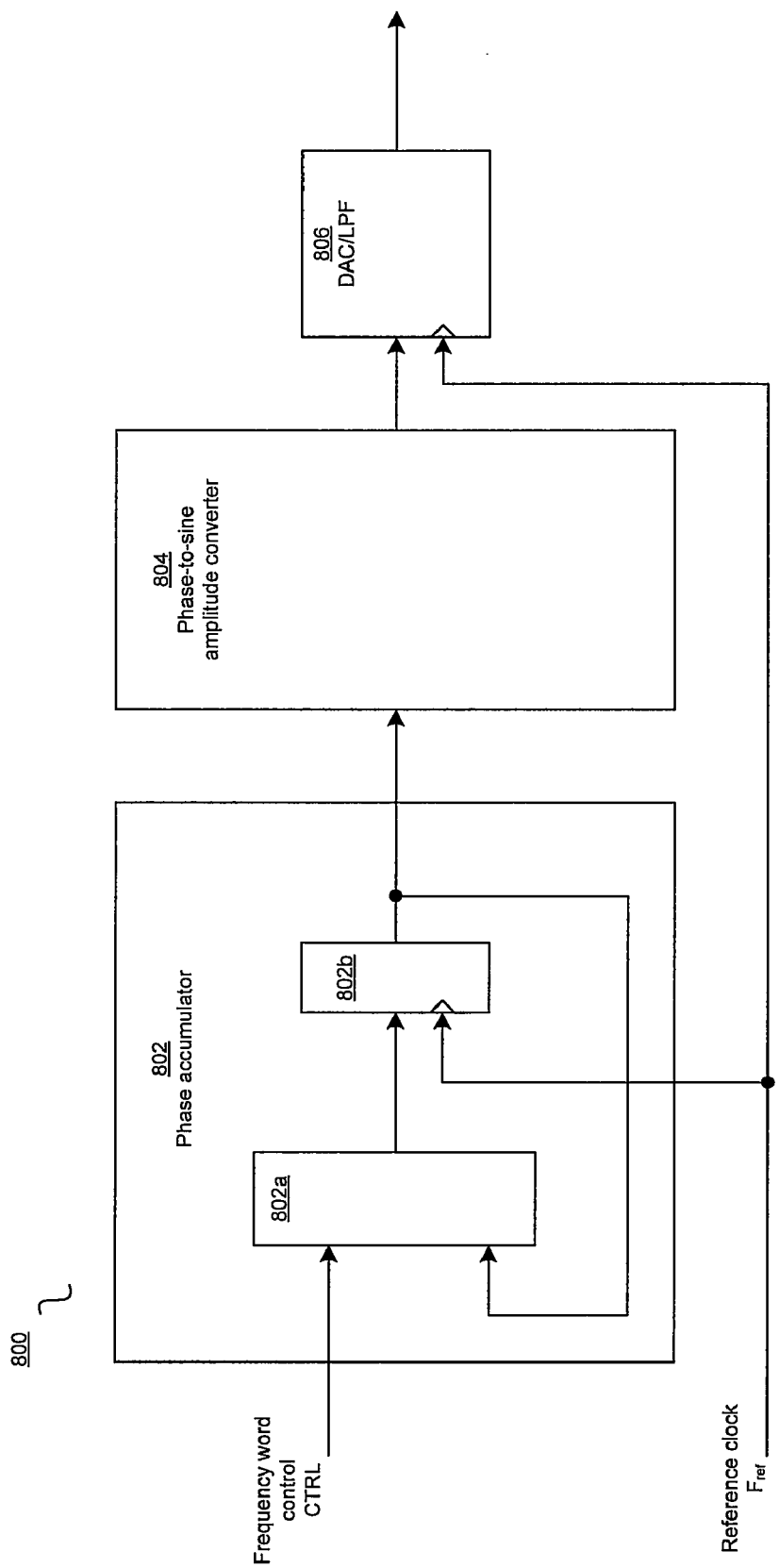
FIG. 8 is a block diagram illustrating an exemplary direct digital frequency synthesizer, in accordance with an embodiment of the invention.

FIG. 8 is a block diagram illustrating an exemplary direct digital frequency synthesizer, in accordance with an embodiment of the invention. Referring to FIG. 8, there is shown a direct digital frequency synthesizer (DDFS) 800 comprising a phase accumulator 802, a phase-to-sine amplitude converter 804, and a digital-to-analog converter (DAC) 806. The DDFS 800 may be similar in functionality to the DDFS 404. The phase accumulator 802 may comprise an adder 802a that may enable integrating an input signal, such as, for example, a frequency control word CTRL, by adding it to a previous integrated value stored in a register 802b on each cycle of a reference clock $F_{ref}$. The frequency control word CTRL may be provided by, for example, the processor 156 and/or the baseband processor 154. Various embodiments of the invention may also comprise a control word block (not shown) that may be used to provide the control word. The reference clock $F_{ref}$ may be communicated by, for example, the divider block 402. The reference clock $F_{ref}$ may be fixed-frequency or varying frequency. In the case of a varying reference clock $F_{ref}$, the change in frequency may be compensated by altering the frequency control word CTRL such that the output of the DDFS may comprise a desired frequency and/or phase.

The phase-to-sine amplitude converter 804 may comprise suitable logic, circuitry, and/or code that may enable converting the output of the phase accumulator 802 to an approximated sine amplitude. For example, the conversion may be achieved via a look-up table. Although only a single output may be shown for exemplary purposes, a plurality of signals may be generated where each signal may be phase shifted from the others. For example, where I and Q signals may be needed, the phase-to-sine amplitude converter 804 may utilize a plurality of different look-up tables for each input value. In an exemplary embodiment of the invention, a first look-up table may be utilized for the I signal and a second look-up table may be utilized for the Q signal.

The DAC 806 may comprise suitable logic and/or circuitry that may enable converting the digital output of the phase-tosine amplitude converter 804 to an analog output. The DAC 806 may also comprise, for example, a low-pass filter that may be used to "smooth" the analog output. Where the DDFS 800 may generate, for example, I and Q signals, there may be a DAC for generating an I signal and a DAC for generating a Q signal. Accordingly, the DDFS 800 may be a digitally-controlled signal generator that may vary phase, frequency, and/or amplitude of one or more output signals based on a single reference clock $F_{ref}$ and a frequency control word CTRL.

In operation, the frequency control word CTRL may be provided to the adder 802a, and may be successively added to an integrated value stored in the register 802b. The adding may occur, for example, on each cycle of the reference clock $F_{ref}$. In this manner, the sum may eventually be greater than the maximum value the accumulator can store, and the value in the accumulator may overflow or "wrap". Accordingly, an N-bit phase accumulator 802 may overflow at a frequency $F_{out}$ given by the following equation:

$$F_{out}=(F_{ref}*CTRL)/2^N \qquad [2]$$

In this manner, the output of the phase accumulator 802, which may be referred to as $F_{out}$, may be periodic at a period of $1/F_{out}$ and may represent the phase angle of a signal. In this regard, the DDFS 800 may operate as a frequency generator that generates one or more sine waves or other periodic waveforms over a large range of frequencies, from almost DC to approximately half the reference clock frequency $F_{ref}$.

Prior to changing the frequency control word CTRL, the state of the DDFS 800 may be saved in, for example, a memory such as the system memory 158. In this manner, the output signal $F_{out}$ may be interrupted and then resumed without losing the phase information comprising the generated signals. For example, the DDFS 800 may resume generating the output signal $F_{out}$ using the saved state loaded from, for example, the system memory 158. Accordingly, the output signal $F_{out}$ may resume from the last phase angle transmitted before the signal was interrupted.

Figure 9:
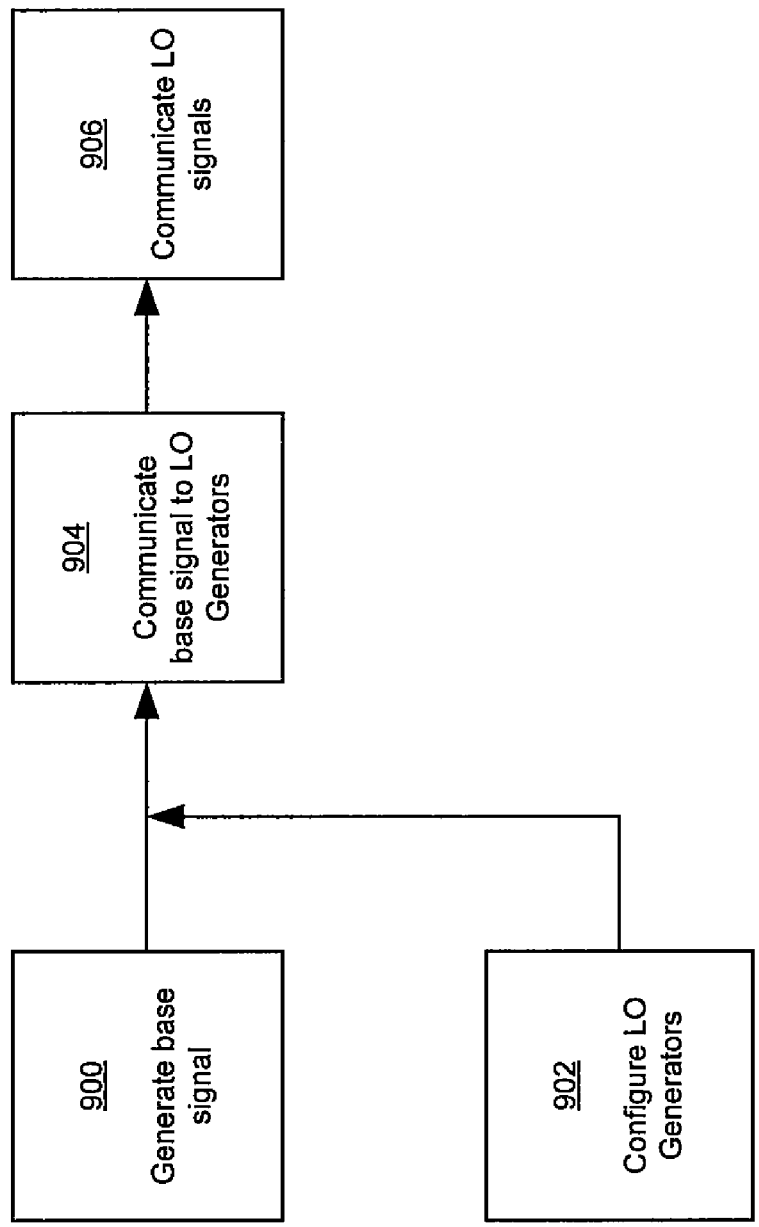
FIG. 9 is a flow diagram illustrating exemplary steps for using a single PLL to clock an array of DDFS for multi-protocol applications, in accordance with an embodiment of the invention.

FIG. 9 is a flow diagram illustrating exemplary steps for using a single PLL to clock an array of DDFS for multi-protocol applications, in accordance with an embodiment of the invention. Referring to FIG. 9, there are shown steps 900 to 906. In step 900, the PLL 302 may be, for example, configured to output a signal $F_{base}$ with a specific frequency. The frequency may be selected, for example, for use with the plurality of local oscillator generators 310, 320, 330, ..., 340. Configuring may comprise, for example, setting a voltage controlled oscillator (not shown) to output a desired reference frequency and/or setting a feedback counter (not shown) to specific divide factors.

In step 902, the local oscillator generators 310, 320, 330, ..., 340 may be configured to use the base signal $F_{base}$ to generate local oscillator signals at a desired frequency. For example, a local oscillator generator that may be implemented using a digital delay line, as described with respect to FIG. 7A, may receive the base signal $F_{base}$ and generate a local oscillator signal that may have twice the frequency of the base signal $F_{base}$. Other embodiments of the local oscillator generator may generate local oscillator signals using, for example, one of the implementation described with respect to FIGS. 4-6, or a simple DDFS circuit as described with respect to FIG. 8. The specific type of a local oscillator generator may be design dependent.

Configuring the local oscillator generators may comprise, for example, setting the divide factor for the divider blocks 402, 406, 502, 506, 602, and/or 606. Configuring the local oscillator generators may also comprise, for example, determining the frequency control word for a DDFS. The divide factor determined for the divider blocks 402, 502, and 602 may determine the reference clock frequency for the DDFS 404, 504, and 604, respectively.

In step 904, the base signal $F_{base}$ from, for example, the PLL 302 may be communicated to the local oscillator generators 310, 320, 330, ..., 340. The specific implementation, and configuration for each of the local oscillator generators 310, 320, 330, ..., 340 may determine a specific local oscillator signal generated by each local oscillator generator.

In step 906, the local oscillator signals, which may each be generated independently by the local oscillator generators 310, 320, 330, ..., 340, may be communicated to one or more of the mixers 312, 322, 332, ..., 342. Each of the mixers 312, 322, 332, ..., 342 may use the respective local oscillator signal, for example, to down-convert a received RF signal or up-convert a signal to RF for transmission.

In accordance with an embodiment of the invention, aspects of an exemplary system may comprise, for example, the PLL 302 that may generate a first signal $F_{base}$, which may be referred to as a base signal, for use in generating local oscillator signals. Each of the local oscillator signals may be generated independently of each other. The first signal $F_{base}$ may be communicated to the local oscillator generators 310, 320, 330, ..., 340 to generate the local oscillator signals. The local oscillator generators 310, 320, 330, ..., 340 may generate local oscillator signals that may be communicated to, for example, one or more of the mixers 312, 322, 332, ..., 342. Each of the mixers 312, 322, 332, ..., 342 may use one of the local oscillator signals for down-conversion of received signals or up-conversion of signals to be transmitted.

One or more of the local oscillator generators 310, 320, 330, ..., 340 may utilize a digital delay circuit 702 to generate local oscillator signals. The digital delay circuit 702 may generate a second signal $F_{delay}$ that may be 90° out of phase with the first signal. The first signal $F_{base}$ may be mixed with the second signal $F_{delay}$ to generate the signal $F_{LO}$ that may comprise twice the frequency of either the first signal $F_{base}$ or the second signal $F_{delay}$. The signal $F_{LO}$ may be phase shifted by the phase shifter block 706 to generate the in-phase component LO_I and the quadrature phase component LO_Q.

The local oscillator generators 310, 320, 330, ..., 340 may also utilize a direct digital frequency synthesizer (DDFS), such as, for example, the DDFS 404, 504, and/or 604, for generation of local oscillator signals. The DDFS utilized may receive, for example, a reference clock signal from one of the divider blocks 402, 502, or 602. A processor, such as, for example, the processor 156 and/or the baseband processor 154, may adjust a divide factor for one or more of the divider blocks 402, 502, and 602 to vary a frequency of a local oscillator signal generated by a local oscillator generator.

The processor 156 and/or the baseband processor 154 may also adjust a divide factor for one of the divider blocks 406, 506, and/or 606 that may generate a second signal. The second signal may be communicated to one of the phase shifter blocks 508 or 608, or the mixer block 408 to mix with a signal generated by the DDFS. Varying the second signal may therefore vary a frequency of a local oscillator signal. The processor 156 and/or the baseband processor 154 may also vary a frequency of a local oscillator signal by adjusting one or more frequency control words that are to be received by the DDFS 404, 504, or 604 in a corresponding local oscillator generator.

Another embodiment of the invention may provide a machine-readable storage, having stored thereon, a computer program having at least one code section executable by a machine, thereby causing the machine to perform the steps as described above for utilizing a single PLL to clock an array of DDFS for multi-protocol applications.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing signals, the method comprising:
   generating a first signal utilizing a phase-locked-loop (PLL);
   generating a local oscillator signal from said generated first signal in each of a plurality of local oscillator generators directly coupled to said PLL, wherein each of said plurality of local oscillator signals is generated independently of each other by corresponding circuitry that comprises one of a direct digital frequency synthesizer (DDFS) or a digital delay circuit; and
   wirelessly communicating utilizing a plurality of protocols in which a transmission carrier frequency is different from a reception carrier frequency, wherein for each of said plurality of protocols said transmission carrier frequency is associated with one of said generated plurality of local oscillator signals and is different from a transmission carrier frequency of another of said plurality of protocols, and said reception carrier frequency is associated with another of said generated plurality of local oscillator signals and is different from a reception carrier frequency of another of said plurality of protocols.

2. The method according to claim 1, comprising communicating one or more of said local oscillator signals to one or more mixers, wherein each mixer performs one of: down-conversion of received signals and up-conversion of signals to be transmitted.

3. The method according to claim 1, comprising varying a frequency of a local oscillator signal by adjusting a divide factor for a divider that generates a reference clock for said DDFS.

4. The method according to claim 1, comprising varying a frequency of a local oscillator signal by adjusting a divide factor for a divider that generates a second signal that is used for mixing with a signal generated by said DDFS.

5. The method according to claim 1, comprising varying a frequency of a local oscillator signal by adjusting one or more frequency control words to be received by said DDFS in a corresponding one of said plurality of local oscillator generators.

6. The method according to claim 1, comprising delaying a phase of said first signal by said digital delay circuit to generate a second signal that is substantially 90° out of phase with said first signal.

7. A machine-readable storage having stored thereon, a computer program having at least one code section for processing signals, the at least one code section being executable by a machine for causing the machine to perform steps comprising:
   generating a first signal utilizing a phased-locked-loop (PLL);
   generating a local oscillator signal from said generated first signal in each of a plurality of local oscillator generators directly coupled to said PLL, wherein each of said plurality of local oscillator signals is generated independently of each other by corresponding circuitry that comprises one of a direct digital frequency synthesizer (DDFS) or a digital delay circuit; and
   wirelessly communicating utilizing a plurality of protocols in which a transmission carrier frequency is different from a reception carrier frequency, wherein for each of said plurality of protocols said transmission carrier frequency is associated with one of said generated plurality of local oscillator signals and is different from a transmission carrier frequency of another of said plurality of protocols, and said reception carrier frequency is associated with another of said generated plurality of local oscillator signals and is different from a reception carrier frequency of another of said plurality of protocols.

8. The machine-readable storage according to claim 7, wherein at least once code section comprises code that enables communication of one or more of said local oscillator signals to one or more mixers, wherein each mixer performs one of: down-conversion of received signals and up-conversion of signals to be transmitted.

9. The machine-readable storage according to claim 7, wherein the at least one code section comprises code that enables varying a frequency of a local oscillator signal by adjusting a divide factor for a divider that generates a reference clock for said DDFS.

10. The machine-readable storage according to claim 7, wherein the at least one code section comprises code that enables varying a frequency of a local oscillator signal by adjusting a divide factor for a divider that generates a second signal that is used for mixing with a signal generated by said DDFS.

11. The machine-readable storage according to claim 7, wherein the at least one code section comprises code that enables varying a frequency of a local oscillator signal by adjusting one or more frequency control words to be received by said DDFS in a corresponding one of said plurality of local oscillator generators.

12. The machine-readable storage according to claim 7, wherein the at least one code section comprises code that enables delaying of a phase of said first signal by said digital delay circuit to generate a second signal that is substantially 90° out of phase with said first signal.

13. A system for processing signals, the system comprising:
- one or more circuits comprising a phase-locked-loop (PLL) circuit that enables generation of a first signal;
- said one or more circuits comprise a plurality of local oscillator generators directly coupled to said PLL circuit that enable generation of a plurality of local oscillator signals from said generated first signal, wherein each of said plurality of local oscillator signals is generated independently of each other by a corresponding one of said plurality of local oscillator generators that comprises one of a direct digital frequency synthesizer or a digital delay circuit; and
- said one or more circuits enable wireless communication utilizing a plurality of protocols in which a transmission carrier frequency is different from a reception carrier frequency, wherein for each of said plurality of protocols said transmission carrier frequency is associated with one of said generated plurality of local oscillator signals and is different from a transmission carrier frequency of another of said plurality of protocols, and said reception carrier frequency is associated with another of said generated plurality of local oscillator signals and is different from a reception carrier frequency of another of said plurality of protocols.

14. The system according to claim 13, wherein said one or more circuits enable communication of one or more of said local oscillator signals to one or more mixers, where each mixer performs one of: down-conversion of received signals and up-conversion of signals to be transmitted.

15. The system according to claim 13, wherein said one or more circuits comprise one or more processors that enable adjusting a divide factor for a divider that generates a reference clock for said DDFS, for varying a frequency of a local oscillator signal.

16. The system according to claim 13, wherein said one or more circuits comprise one or more processors that enable adjusting a divide factor for a divider that generates a second signal that is used for mixing with a signal generated by said DDFS, for varying a frequency of a local oscillator signal.

17. The system according to claim 13, wherein said one or more circuits comprise one or more processors that enable adjusting of one or more frequency control words to be received by said DDFS in a corresponding one of said plurality of local oscillator generators, for varying a frequency of a local oscillator signal.

18. The system according to claim 13, wherein said one or more circuits that comprise said digital delay circuit enable varying of a phase of said first signal to generate a second signal that is substantially 90° out of phase with said first signal.

* * * * *